(12) United States Patent
Jannarone et al.

(10) Patent No.: US 7,127,439 B2
(45) Date of Patent: Oct. 24, 2006

(54) AUTOMATED ANALYZERS FOR ESTIMATION SYSTEMS

(75) Inventors: Robert Jannarone, San Diego, CA (US); David Homoki, Marietta, GA (US); Amanda Rasmussen, Atlanta, GA (US)

(73) Assignee: Netuitive, Inc., Reston, VA (US)

( * ) Notice: Subject to any disclaimer, the term of this patent is extended or adjusted under 35 U.S.C. 154(b) by 780 days.

(21) Appl. No.: 10/165,232

(22) Filed: Jun. 7, 2002

(65) Prior Publication Data

US 2002/0188582 A1 Dec. 12, 2002

Related U.S. Application Data

(60) Provisional application No. 60/296,912, filed on Jun. 8, 2001.

(51) Int. Cl.
*G06F 17/17* (2006.01)
*G06F 17/18* (2006.01)
*G05B 19/418* (2006.01)

(52) U.S. Cl. .............................. 706/25; 706/17; 706/23
(58) Field of Classification Search .................. 706/26; 702/186
See application file for complete search history.

(56) References Cited

U.S. PATENT DOCUMENTS

| | | | |
|---|---|---|---|
| 5,239,594 A | 8/1993 | Yoda | |
| 5,444,819 A | 8/1995 | Michiro | 706/21 |
| 5,461,699 A | 10/1995 | Arbabi | 706/21 |
| 5,727,128 A | 3/1998 | Morrison | |
| 5,748,508 A | 5/1998 | Baleanu | 703/13 |
| 5,748,851 A | 5/1998 | Iokibe | 706/58 |
| 5,953,707 A | 9/1999 | Huang | 705/10 |
| 6,208,953 B1 * | 3/2001 | Milek et al. | 703/7 |
| 6,647,377 B1 | 11/2003 | Jannarone | |
| 2001/0034637 A1 | 10/2001 | Lin et al. | 705/14 |
| 2003/0036890 A1 | 2/2003 | Billet | 703/2 |
| 2003/0139905 A1 | 7/2003 | Helsper | 702/182 |

FOREIGN PATENT DOCUMENTS

| | | |
|---|---|---|
| EP | 89118487.1 | 10/1989 |
| EP | 92114059.6 | 8/1992 |
| WO | WO 98/22885 | 5/1998 |

OTHER PUBLICATIONS

Woodward, 5009 Fault-tolerant control, 1997.*

(Continued)

*Primary Examiner*—Anthony Knight
*Assistant Examiner*—Nathan H. Brown, Jr.
(74) *Attorney, Agent, or Firm*—Michael J. Mehrman; Mehrman Law Office P.C.

(57) ABSTRACT

This invention specifies analyzers to be run in conjunction with computer estimation systems, which may be applied to performance monitoring (APM) services. A semi-automated analyzer may be used by a human analyst to periodically evaluate available historical data for establishing a desired set of input measurements, model parameters, and reporting criteria, collectively called configuration parameters, to be used by an estimation system. In addition, a fully automated analyzer may periodically and automatically reevaluate such configuration parameters and automatically reconfigure the estimation system accordingly. For both types of analyzer, the active set of input measurements for the computerized estimation system can be initially established or periodically updated to perform any variety of configuration tuning operations, including the following: removing linearly redundant variables; removing inputs showing no variation; removing unnecessary or non-estimable inputs; tuning estimation system operating parameters that govern learning rates and the use of recent trends; occasional model accuracy assessment; and tuning monitoring alarm thresholds.

25 Claims, 8 Drawing Sheets

OTHER PUBLICATIONS

LeBaron, Blake; Arthur, W. Brian, and Palmer, Richard. "Time series properties of an artificial stock market." Journal of Economic Dynamics & Control, Nov. 20, 1998.

You, Chun, and Chandra, Kavitha. "Time series models for Internet Data Traffic." Local Computer Networks, 1999, pp. 164-171.

* cited by examiner

| RUN | POWER DEGREE | NUM STEPS | LEARNING BLOCKS |
|---|---|---|---|
| CANDIDATE - 1 | 0 | 0 | 48 |
| CANDIDATE - 2 | 1 | 3 | 48 |
| CANDIDATE - 3 | 3 | 6 | 48 |
| CANDIDATE - 4 | 0 | 0 | 96 |
| CANDIDATE - 5 | 1 | 3 | 96 |
| CANDIDATE - 6 | 3 | 6 | 96 |
| CANDIDATE - 7 | 0 | 0 | 672 |
| CANDIDATE - 8 | 1 | 3 | 672 |
| CANDIDATE - 9 | 3 | 6 | 672 |

RUN PARAMETERS - MODEL TUNING — 46D

AUTOMATED ANALYZERS FOR ESTIMATION SYSTEMS

REFERENCED TO RELATED APPLICATIONS

This application claims priority to commonly-owned U.S. Provisional Patent Application Ser. No. 60/296,912 filed on Jun. 8, 2001, which is incorporated herein by reference. This application also incorporates by reference the disclosure of the following commonly-owned patents and patent applications: U.S. Pat. No. 5,835,902; U.S. Pat. No. 6,216,119; U.S. Pat. No. 6,289,330; and U.S. Pat. No. 6,876,988.

TECHNICAL FIELD

This invention relates to computerized estimation systems and more specifically relates to analyzers for establishing and updating configuration parameters for estimation systems. In particular, the disclosed embodiment may be implemented as an analyzer for a computer performance estimation system providing application performance monitoring (APM) services.

BACKGROUND OF THE INVENTION

A variety of sophisticated systems have been developed for monitoring and forecasting performance in various fields. These monitoring and forecasting systems may be referred to, collectively or individually, as "estimation systems." For example, conventional statistics systems, artificial neural network systems, or concurrent learning and information processing (CLIP) systems capable of monitoring and forecasting a large number of variables have been developed for use in a variety of fields including computer performance monitoring and forecasting, visual image processing, electricity demand forecasting, and commodity price forecasting. These estimation systems typically use a number of measured input values to impute (i.e., estimate for a current time trial) current values for monitoring, and they may also predict (i.e., estimate for future time trials) future input values. In particular, these systems may compare imputed input values with actual input values to identify abnormal input values when they occur, and they may also predict or forecast the likelihood that future input values will become abnormal.

The mathematical core technology of these monitoring and forecasting systems may involve the computation of a matrix of estimation parameters, also called learned parameters. This matrix typically contains observed relationships, such as the covariances, between input and output variables. Estimation systems may also utilize the inverse of the covariance matrix, which is sometimes referred to as a "connection weight matrix." In particular, the elements of the covariance matrix are typically estimated through the application of statistical analysis to a historical database of input and output values. Once the covariance matrix has been computed, it may be inverted to obtain the connection weight matrix, which can be used to directly compute estimates for the output values from a given set of input values through standard matrix computations.

Moreover, once the covariance and connection weight matrices have been initially determined, they may be used to perform monitoring and forecasting on a CLIP basis. That is, a new set of computed output values may be computed for each time trial of measured input values, and for each time trial either the covariance matrix, the connection weight matrix, or both may be updated to achieve learning while the system performs its monitoring and prediction functions. See in particular U.S. Pat. No. 5,835,902.

With these systems, certain estimation problems may exist initially, while others may develop over time. For example, some input variables may not be predictive of output variables initially, while others that are predictive initially may not be predictive later. In addition, some input variables may be linearly redundant initially while others may become linearly redundant later.

Some of these problems may be solved in order to improve estimation efficiency while others should be solved in order to prevent numerical errors. For example, if many useless inputs are included in an estimation system, estimation accuracy degrades significantly. As a second example, if linearly redundant inputs exist initially or develop over time, computer processors may attempt to divide by zero, which may cause computer operations to break down. To avoid these problems, historical data may be continually reevaluated to ensure that the most effective input values and estimation algorithms are in use. This process is known as model refinement.

Traditionally, model refinement operations have been conducted by expert analysts, using representative data in a historical sample. Such operations typically take considerable effort and time, which may be acceptable in settings where representative datasets are easy to obtain and estimation conditions do not change rapidly. However, such operations may be impractical or impossible in settings where information is arriving quickly and conditions are changing rapidly. One such setting is application performance monitoring (APM) services, where computer monitoring variables, such as computer usage and input-output rates, fluctuate systematically on a daily basis or even on a sub-hourly basis. A continuing need therefore exists for effective and efficient model refinement systems, and in particular for systems that simplify and automate the model refinement process.

In addition to the model refinement need, a second need exists to refine the sensitivity of monitoring systems. The information produced by an estimation system can be used to identify detected or predicted problems only when the information produced by the estimation system is effectively communicated to system administrators. Typically, a system of alerts and alarms may be used to notify the system administrators when the estimation system detects a problem. However, the sensitivity of the monitored system to the measured input values can change over time. Unless the alert and alarm levels are adjusted to reflect these underlying system changes, they can become inappropriate, for example by producing too many false alarms or by producing too few valid alarms. To avoid these problems, reporting indicators such as alert and alarm levels may be continually reevaluated to ensure that the most effective alert and alarm thresholds are in use. This process is known as reporting refinement. A continuing need exists for effective and efficient reporting refinement systems, and in particular for systems-that simplify and automate the reporting refinement process.

Therefore, a continuing need exists for more effective, useful, automated, and understandable systems for configuring and monitoring estimation systems generally, and computer performance estimation systems in particular. In addition, a continuing need exists for more effective model refinement and reporting refinement systems.

SUMMARY OF THE INVENTION

The present invention meets the needs described above in an analyzer that performs model refinement and reporting refinement on a semi-automatic or fully automatic basis. This analyzer continually tunes the estimation system, for example on a monthly, weekly or daily basis, to ensure that proper model and reporting parameters are in use. The semi-automatic analyzer operates as an aid to a human operator, who tunes the estimation system based on output data produced by the analyzer. In the fully automated analyzer, the analyzer itself periodically implements model refinement and reporting refinement, and automatically updates the estimation system without the need for human intervention. As a result, the present invention provides two different model refinement and reporting refinement tools for use with current and future estimation systems.

Generally described, the present invention may be embodied in an analyzer that operates in or for an estimation system which, in turn, is operable for receiving input values for successive time trials. For each time trial, the estimation system computes output values based on the input values and learned parameters, and updates the learned parameters to reflect relationships, such the covariance, observed among the input and output values. A first type of analyzer receives historical data comprising samples of the input and output values for a plurality of time trials. The analyzer also receives a set of model reduction configuration parameters, including specifications for a statistical model that may be implemented by the estimation system. The analyzer then activates the estimation system to run the historical data on the statistical model to compute the output values and update the learned parameters for the statistical model. The analyzer then evaluates the learned parameters to identify input values that are ineffective for estimating the output values and reduces the size of the model by eliminating the ineffective input values. The analyzer typically performs a series of such model reduction steps, including basic screening, linear redundancy elimination, and unnecessary input removal. In addition, the analyzer may be used to periodically repeat the entire refinement process with historical data.

The analyzer may also receive historical data comprising samples of the input and output values for a plurality of time trials and a set of candidate model configuration parameters including specifications for a statistical model that may be implemented by the estimation system. The analyzer may then activate the estimation system to run the historical data on the statistical model to compute the output values and learned parameters for the statistical model. Based on the historical data, the analyzer may perform a model assessment by comparing the computed output values to the historical samples of output values. The analyzer may perform a series of such candidate evaluation steps for a plurality of candidate model configuration parameters, and identify a desired set of the configuration parameters based on the model assessments.

More specifically, the configuration parameters may identify a number of historical input values and a power degree for computing a best fitting polynomial to the recent input values, after which coefficients for the best fit polynomial may be used to update the learned parameters in an operating estimation system. The configuration parameters may also include a learning configuration parameter for use in updating the learned parameters, and the configuration parameters may also specify a number of forecast steps for computing output values. In addition, the analyzer may specify a plurality of candidate model configuration parameters sets, each set of which reflects a distinct candidate set of configuration parameters comprising the number of historical input values, the polynomial degree, and the learning configuration parameter.

The analyzer may also receive historical data comprising samples of the input and output values for a number of time trials, and a set of candidate model configuration parameters including specifications for a statistical estimation model that may be implemented by the estimation system. The analyzer may then activate the estimation system to run the historical data on the statistical model to compute the output values and update learned parameters for the statistical model, and compute alert thresholds for output values based on observed deviance values between the computed output values and the historical samples of output values to obtain a desired alert sensitivity. The analyzer may also compute a global deviance value for the output values, and a global deviance threshold for the global deviance value based on observed deviance values between the computed output values and the historical samples of output values to obtain a desired alarm sensitivity.

The analyzer described thus far operates semi-automatically to perform model and reporting refinement operations, as operated by an analyst who runs the analyzer in batch mode, and then uses the analyzer results to choose a model for real-time deployment. Accordingly, this type of analyzer is called a semi-automated analyzer to distinguish it from a fully automated alternative described next.

In addition to the semi-automated analyzer, a second type of analyzer may operate in a fully automatic mode. Instead of requiring historical data for refinement during a batch process, the fully automated analyzer refines model configuration parameters routinely during the CLIP process. As a model refinement example that distinguishes semi-automatic from fully automatic operation, while the semi-automated analyzer identifies the best candidate inputs by running several models on the same historical data, the fully automated analyzer identifies the best candidate model routinely by running several competing models continually, occasionally comparing them for accuracy, and generating output based on the best recently performing model. As a reporting refinement example, while the semi-automated analyzer identifies the best alarm threshold by comparing several thresholds with historical data, the fully automated analyzer continually monitors alarm rates and automatically adjusts them as necessary to pre-specified set points.

Although specifically developed for use in a computer performance estimation system, the analysis and configuration systems described and claimed in this patent may also be used in connection with other types of estimation systems including, but not limited to conventional statistics and artificial neural network systems. Furthermore, the configuration systems described and claimed in this patent for APM may be applied to a variety of fields, including but not limited to electricity demand forecasting, commodities price forecasting, aircraft component failure monitoring systems, image processing systems, and so forth.

In view of the foregoing, it will be appreciated that the present invention greatly facilitates the configuration and reporting features of estimation systems generally, and computer performance estimation systems in particular. The specific techniques and structures employed by the invention to improve over the drawbacks of prior estimation systems to accomplish the advantages described above will become apparent from the following detailed description of the embodiments of the invention and the appended drawings and claims.

DETAILED DESCRIPTION OF THE EMBODIMENTS

Figure 1:
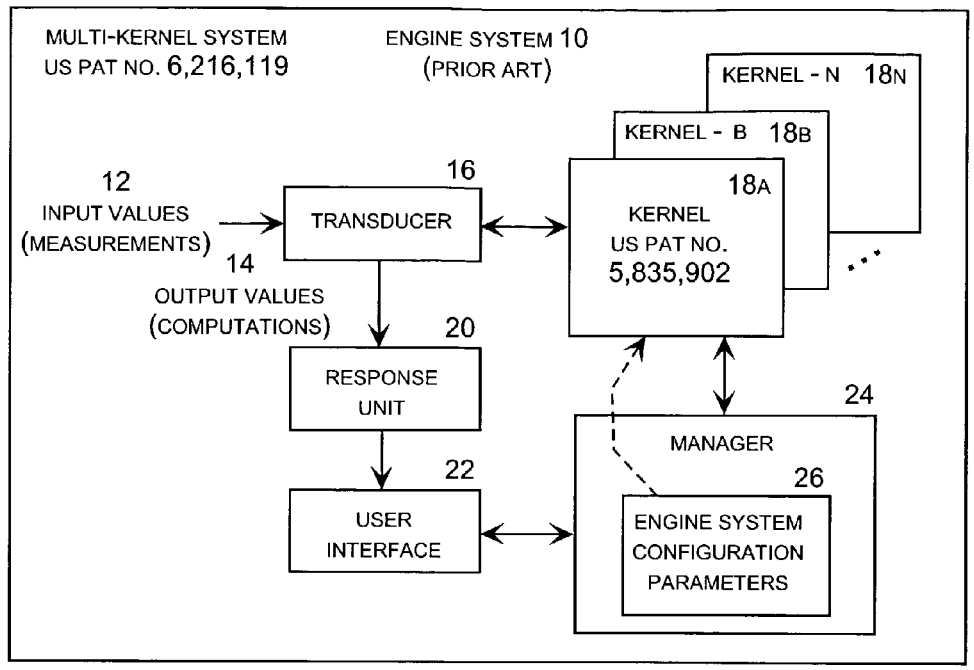
FIG. 1 is a functional block diagram of a prior art multi-kernel estimation system.

The present invention may be embodied in analyzers configured to run in conjunction with computer estimation systems, which may be applied to application performance monitoring (APM) services. A semi-automated analyzer may be used by a human analyst to periodically evaluate available historical data for establishing a desired set of input measurements, model parameters and reporting criteria, collectively called configuration parameters, to be used by an estimation system. In addition, a fully automated analyzer may periodically and automatically reevaluate such configuration parameters and automatically reconfigure the estimation system accordingly. For both types of analyzer, the active set of input measurements for the computerized estimation system can be initially established or periodically updated to perform any or all of a variety of configuration tuning operations, including the following: removing linearly redundant variables; removing inputs showing no variation; removing unnecessary or non-estimable inputs; tuning estimation system operating parameters that govern learning rates and the use of recent trends; occasional model accuracy assessment; and tuning monitoring alarm thresholds.

In particular, the present invention may be embodied in an analyzer for an estimation system that utilizes learned parameters, such as a matrix containing covariance values between input and output variables or the inverse of the covariance matrix, which is also called a connection weight matrix. In a concurrent learning and information processing (CLIP) system, the values of the connection weight matrix are typically determined through the application of correlation analysis to a historical database of input and output values.

Once the covariance and connection weight matrices have been initially determined, they may be used to perform monitoring and forecasting on a real-time basis. That is, a new set of output values may be computed for each time trial of measured input values. In addition, the connection weight matrix may be updated for each time trial to implement learning while the system performs its monitoring and prediction functions. The updating of the connection weight matrix can be performed in two ways. First, the covariance matrix may be updated for each time trial and then inverted. Second, the inverted covariance matrix may be updated directly.

Two recurring problems have been identified with these types of systems. First, stability and estimation accuracy may be either poor initially or degrade eventually. For example, the stability of the mathematical computations used to implement the learning portion of the cycle degrades when the set of input variables includes some redundant variables that are linear combinations of other input variables. For this reason, the available set of input measurements is typically analyzed to eliminate redundant variables. However, the relationships among input values, and between input and output values, can change over time, which changes the redundant variables and linear combinations of input variables occurring in a particular set of available input measurements.

To solve the redundancy problem, the semi-automated analyzer may be used to periodically reevaluate available historical data to reestablish a desired set of input measurements to be included in the estimation algorithm. In particular, input variables eliminated from the estimation algorithm are periodically reevaluated so that the active set of input measurements can be periodically updated to reflect changes in the redundant variables occurring in a particular set of input measurements.

This partial or full automation of the model refinement process typically includes the steps of basic screening, linear redundancy elimination, unnecessary input removal, model tuning, and model assessment. In addition, the model tuning process may involve the analysis and evaluation of a set of competing candidates sets of model parameters, and the selection of a preferred set of model parameters. For example, three key parameters may be systematically varied through three values each to define nine competing candidates sets of model parameters. A batch processing script may be used to implement the model refinement process according to a desired schedule in conjunction with either the partially automated or fully automated analyzer. Furthermore, the model tuning process may involve the evaluation and removal of input variables that may be unnecessary for the estimation of output variables.

The second recurring problem occurs in cases when the sensitivity of the monitored system to the measured input values either is not acceptable initially or becomes unacceptable over time, resulting in either too many false alarms or too few valid alarms. Therefore, the semi-automated analyzer initially sets alarm and alert levels, while the fully automated analyzer periodically analyzes and adjusts the alert and alarm levels to reflect these underlying system changes. This process is known as reporting refinement. A batch processing script or an automatic analysis process may be used to implement the reporting refinement process according to a desired schedule.

Turning now to the figures, in which like numerals refer to like elements throughout the several figures, FIG. 1 is a functional block diagram of a prior art multi-kernel forecasting engine system 10. As illustrated in FIG. 1 and as described below, the engine system 10 offers a basis for explaining the novelty of the present invention relative to the prior art systems disclosed in U.S. Pat. Nos. 6,216,119, 6,289,330 and 5,835,902, which are incorporated by reference into this specification.

The engine system 10 operates, as governed by the manager 24, in two distinct modes: an on-line mode and an off-line mode. In the on-line mode the engine system 10 produces estimates and updates learned system parameters continually over consecutive time trails, based on a fixed set of configuration parameters 10. By contrast, in the off-line mode the estimation system operates so as to change the configuration parameters 10 without either producing estimates or updating learned parameters. Moreover, in the on-line mode the estimation system operates 10 quickly and for the most part recursively to produce estimates and update learning during each time trial. By contrast, in the off-line mode the engine system 10 performs refinement operations relatively slowly and for the most part iteratively, through operations that either interrupt on-line operations or operate separately but at the same time. In both modes, however, the engine system 10 always operates automatically. Automatic system operation associated with the off-line mode is one feature of the prior art that distinguishes the prior art from the semi-automated analyzer specified in this patent.

In the off-line mode, the engine system 10 performs refinement operations as governed by the manager 24. Refinement operations first assess the quality of the current configuration parameters 26, after which they modify the configuration parameters 26, as appropriate.

Figure 2:
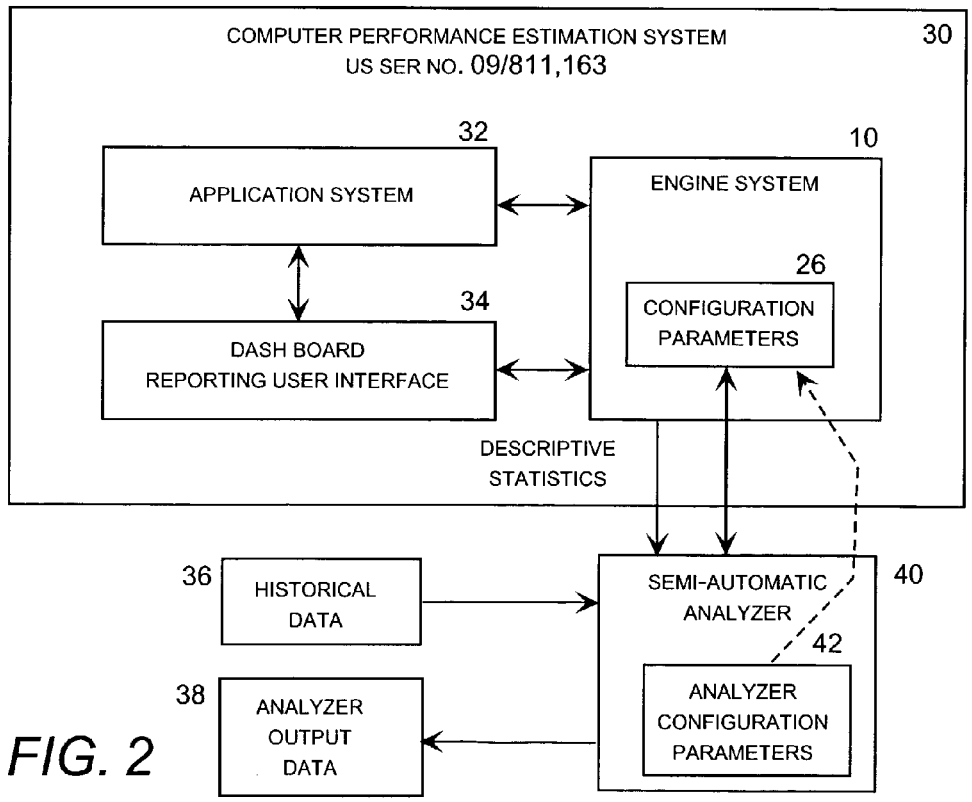
FIG. 2 is a functional block diagram of a computer performance estimation system that includes a semi-automated analyzer for configuring the estimation system.

One current embodiment of the prior art for software APM services, which is shown as element 30 in FIG. 2, is disclosed in co-pending U.S. patent application Ser. No. 09/811,163, which is incorporated by reference into this specification. In this system, the engine system 10 operates in the on-line mode by receiving input values 12 via the transducer 16 at the beginning of every fifteen minute time trial. Next, but during the same fifteen minute time trial, the engine system 10 performs two additional operations: (a) delivering output values 14 via the transducer 16, and (b) updating learned parameter values associated with one or more kernel units 11.

In that same prior art APM system, the engine system 10 receives, via the user interface 22, a set of configuration parameters 26, which specify operation of the kernel units 18 and the transducer 16. Taken together, kernel unit 18 specifications and transducer 16 specifications constitute definitions of one or more estimation models that the engine system 10 utilizes during on-line operation. The engine system 10 may also occasionally receive, via the kernel units 18, a set of updated configuration parameters 26, which may in turn signal the need of modifications in the operation of the kernel units 18 and the transducer 16, in which case the manager 24 may initiate off-line refinement operations. In the current embodiment of the prior art for APM, these refinement operations are limited to modifying the configuration parameters 26 in such a way that the kernel units 18 will correct for input values 12 and transducer 16 values that are linearly redundant.

In addition, the engine system 10 may operate as a dynamically linked library (DLL), which is linked to an executable computer program (EXE) via an application-program interface (API). In terms of the labeled components in FIG. 1, during on-line operation the input values 12 are sent by the EXE to the engine system 10 via the API, and output values 14 are sent back to the EXE by the engine system 10 via the API. During engine system 10 initialization, the EXE also supplies initial configuration parameters 26 via the API. After initialization, some of these initial configuration parameters 26 may change as part of the automatic estimation system refinement process, while others may not.

Automatic off-line operation of the engine system 10 is one feature of the prior art that distinguishes it from the systems described in this patent. That is, the present invention specifies a new, semi-automated analysis process that functions to refine models like the prior art, but unlike the prior art this process is not fully automated and is not designed to operate with continually arriving input data. Instead, the analysis process is semi-automated in a way that allows analysts to analyze historical datasets in order to determine a desired set of configuration parameters for those datasets. As part of this semi-automated process, the embodiments of the present invention described below further specify new refinement operations. These include new ways to remove redundant measurement features, remove unnecessary measurement features, identify optimal learning weights, and identify beneficial uses of recent trends.

The embodiments of the present invention described below further specify a fully automated analyzer that, unlike its semi-automated counterpart, requires neither historical data nor manual operation. Instead, the fully automated analyzer routinely compares competing models, identifies the model that performs best according to selected criteria, and replaces the currently operating model with the best performing model in accordance with a selected schedule in fully automatic fashion.

To explain the fully automated analyzer further in terms of the elements of FIG. 1, the prior art specifies that the engine system 10 may comprise one or more kernel units 18, each of which may operate according to its own configuration parameters 26. Using this multi-kernel specification from the prior art as a point of departure, the embodiments of the present invention described below specify new refinement operation including continual evaluation of a set of competing statistical models based on differing configuration parameters, through which these kernel units 18 may operate simultaneously and competitively on-line, with output being tied to only one of them. These embodiments of the present invention further specify that occasionally their recent performance may be compared off-line by an enhanced version of the fully automated manager 24, in such a way that the best performing kernel unit 18 will be used for output until the next time they are compared off-line.

FIG. 2 is a functional block diagram of a computer performance estimation system 30 that includes a semi-automated analyzer 40 for configuring the estimation system 10. FIG. 2 illustrates how the engine system 10 described in the prior art ties into a pending patent, shown as a computer performance estimation system 30 and filed under co-pending U.S. patent application Ser. No. 09/811,163. As illustrated in FIG. 2 and as described below, the estimation system 30 offers a basis for explaining the operation of the embodiments of the present invention relative to the prior art.

In the prior art embodiments of the estimation system 30, neither the semi-automated nor the fully automated analyzer described in this specification are anticipated, nor are the new facets of refinement described in this patent anticipated. However, the estimation system 30 and the semi-automated analyzer described in this specification may both be implemented as EXEs, and they both use the preexisting engine system 10 as a DLL. In particular, in one current embodiment of the system 30, the application system 32 and the dash board reporting user interface 34 are implemented in the form of an EXE, which calls the engine system 10 DLL.

FIG. 2 also illustrates how the engine system 10 ties into semi-automated analyzer components and processes described in this specification. One major feature of the embodiments of the present invention is the semi-automated analyzer 40. The semi-automated analyzer 40 is an EXE in its own right that, like the estimation system 30 EXE, runs in conjunction with the engine system 10 DLL. However the semi-automated analyzer 40 EXE is distinct from the estimation system 30 EXE in three ways. First, the semi-automated analyzer 40 EXE runs instead of, rather than in conjunction with, the estimation system 30 EXE. Second, the semi-automated analyzer 40 EXE runs a batch process based on historical data 36, rather than as a real-time process that runs continually. Unlike the estimation system 30, which supplies input values 12 at each time point and obtains output values 14 before the next time point, the semi-automated analyzer 40 receives several sets of input values from a file containing historical data 36. Third, some of the semi-automated analyzer 40 operations are governed interactively by a human analyst, rather than operating fully automatically in conjunction with the estimation system 30.

Figure 3:
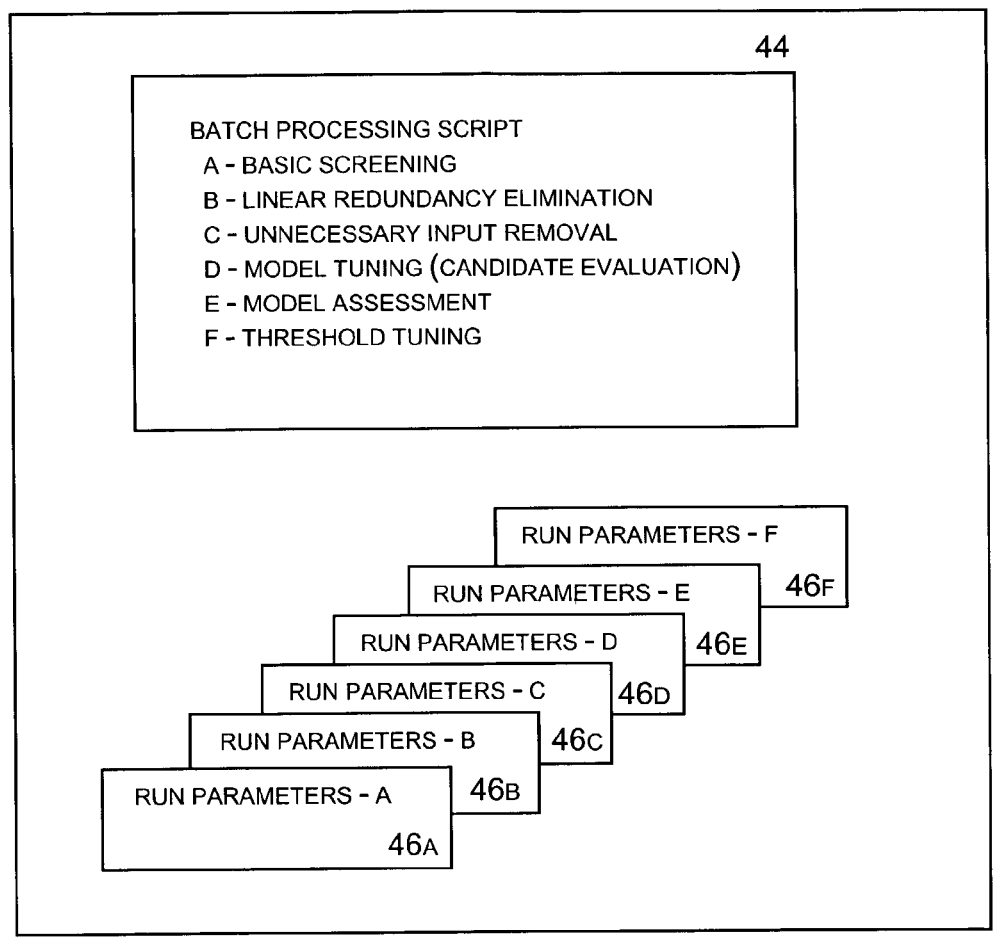
FIG. 3 is a diagram illustrating a batch configuration script for use in configuring a semi-automated analyzer.

FIG. 3 is a diagram illustrating a batch configuration script for setting a specific set of configuration parameters corresponding to a series of runs 46A–F that may be used to configure a semi-automated analyzer. Each of the run parameters shown in FIG. 3 is typically specified for performing each of the operations 46A through 46F. To facilitate the explanation for the configuration process, the specific configuration parameters will first be described with reference to FIGS. 4, 5, 6A and 6B. After this introduction, the description of the batch process shown in FIG. 3 will continue.

Figures 4, 5:
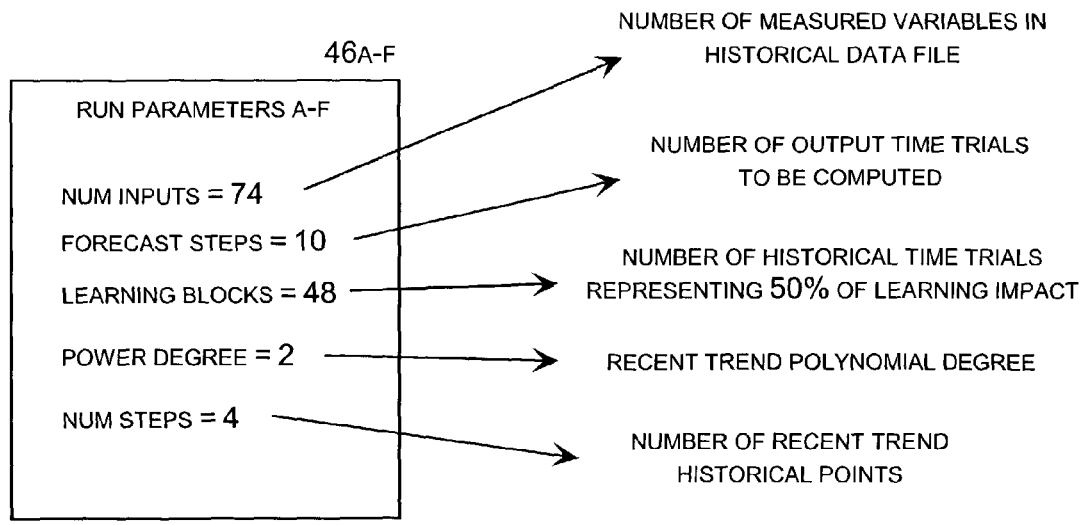
FIG. 4 is a diagram illustrating a specific set of configuration parameters that may be used to configure a semi-automated analyzer.
FIG. 5 is a diagram illustrating a plurality of candidate sets of configuration parameters that may be used to configure a semi-automated analyzer.
Figure 6A:
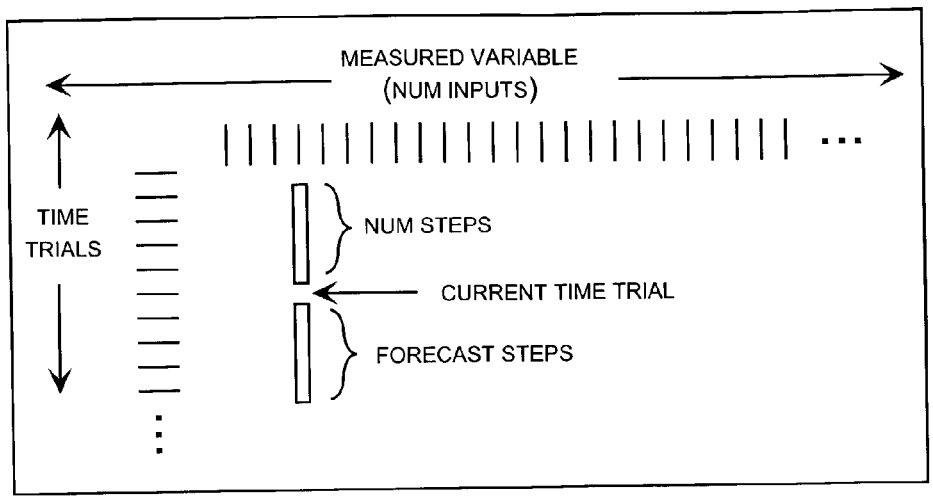
FIG. 6A is a diagram of an input data file illustrating certain configuration parameters.
Figure 6B:
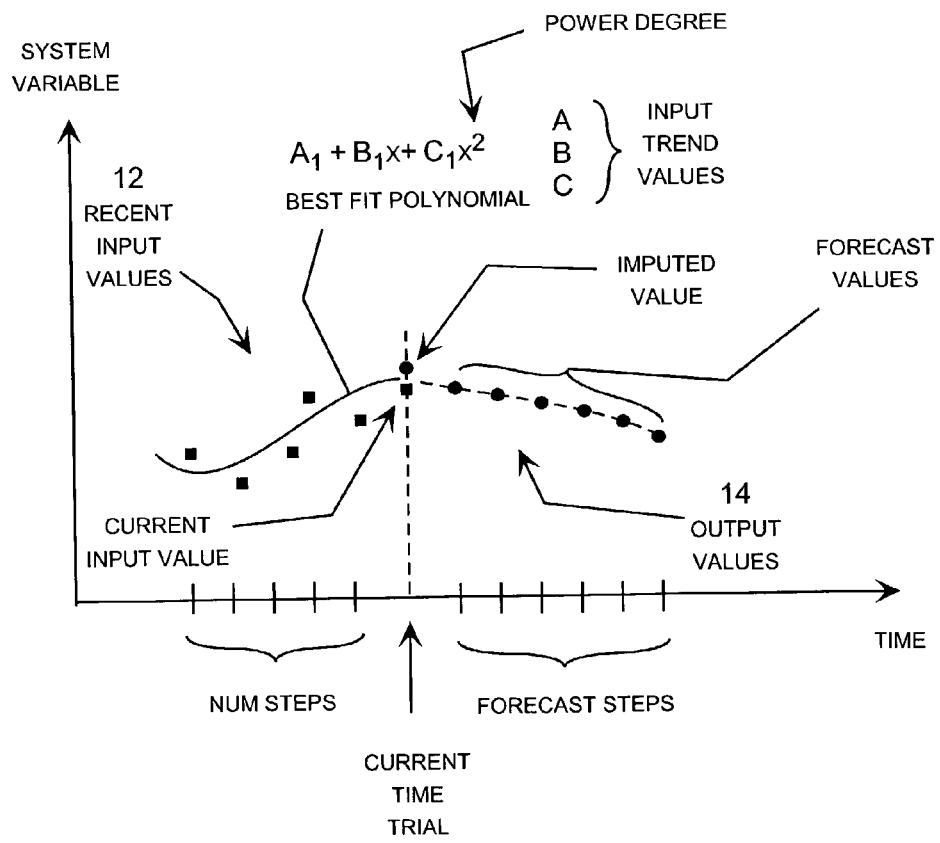
FIG. 6B is a diagram of a best fit polynomial illustrating certain configuration parameters.

FIG. 4 is a diagram illustrating a specific set of configuration parameters that may be used to configure a semi-automated analyzer. These specific configuration parameters are also illustrated in FIGS. 5, 6A and 6B. FIG. 5 is a diagram illustrating a plurality of candidate sets of configuration parameters that may be used to configure a semi-automated analyzer. FIG. 6A is a diagram illustrating an input data file 36 for use in-configuring a-semi-automated analyzer 40. As shown in FIG. 6A, the historical data 36 may be arranged along two facets as shown, with one facet as indicated by the columns in FIG. 3 representing inputs and the other facet as indicated by the rows in FIG. 3 representing time trials. One of the analyzer configuration parameters 42, which is labeled as NUM INPUTS, determines the number of columns in the historical data 36. FIG. 6B is a diagram of a best fit polynomial illustrating certain configuration parameters. This best fit polynomial of a specified order is computed fit to recent input values, and then used to predict future output values.

Turning to the specific configuration parameters, the NUM INPUTS parameter in FIG. 4 is the number of measured variable values included in each row of the historical data 36, which corresponds to the number of columns (i.e., one column per input data value) in the historical data table shown on FIG. 6A. The FORECAST STEPS parameter in FIG. 4 is the number of time points after each CURRENT TIME TRIAL for which forecast input values are produced at each current time trial. This parameter is illustrated on FIGS. 6A and 6B. The LEARNING BLOCKS parameter in FIG. 4 is the number of consecutive previous time trials during which half the learning impact was produced. The use of learning blocks is well known in the prior art. See in particular U.S. Pat. No. 6,216,119.

The POWER DEGREE parameter in FIG. 4 is the degree of a trend polynomial that is fit to recent input values. Polynomial curve fitting in general is well known in the prior art, and the definition of the particular parameter, POWER DEGREE, specified as a configuration parameter is illustrated in FIG. 6B. The NUM STEPS parameter in FIG. 4 is the number of recent input values for which the trend polynomial is fit. This parameter is illustrated on FIGS. 6A and 6B.

As noted above, FIG. 5 is a diagram illustrating a plurality of candidate sets of configuration parameters 46D that may be used to configure a semi-automated analyzer 40. The run parameters in FIG. 5 need only be specified for performing the model tuning (candidate evaluation) process 44D. As shown in FIG. 5, the three values for each of the configuration parameters POWER DEGREE, NUM STEPS and LEARNING BLOCKS are systematically varied to produce nine candidate models. That is, the analyzer 40 may be configured to generate nine candidate runs during refinement operation 44D, each of which is based on a corresponding combination of POWER DEGREE, NUM STEPS, and LEARNING BLOCKS, as shown in FIG. 5.

Referring to FIG. 6A, the engine system 10 is designed to operate automatically, continually, and sequentially with one row of the historical data 36 being supplied to the engine system 10 at each time trial. That is, at each CURRENT TIME TRIAL, the engine system 10 receives one row of the historical data 36 shown in FIG. 6A and performs the polynomial curve fitting operation illustrated in FIG. 6B for each received input value to obtain the polynomial coefficients, which, together with the input data values, defines a complete set of input feature values for the current time trial. The engine system 10 then performs its imputing, learning, and forecasting iterations for the current time trial. Specifically, the engine system 10 uses the CURRENT TIME TRIAL DATA, along with recent input values going back NUM STEPS time points, to impute each current input variable value for monitoring and to predict each input variable FORECAST STEPS values into the future for forecasting.

The series of model runs using the configuration parameters described above will now be described with reference to FIG. 3, which illustrates sets of configuration parameters 46A–F that are used during a series of configuration runs to configure the semi-automated analyzer 40. The blocks within FIG. 3 illustrate the configuration parameters for the model runs 46A–F that are used to specify functional analyzer operations. Each such configuration parameter A–F is typically listed as part of the batch processing script 46A–F, and each such script is represented by its own set of run parameters 46A through 46F.

The semi-automated analyzer 40 may be run by a human analyst anywhere along a range of automation levels. At the least automated level, the analyst may manually enter a complete set of estimation system configuration parameters for only one analyzer pass through the historical data 36, after which the will examine the analyzer output data 38 accordingly. At the most automated level, the analyst may simply enter the NUM INPUTS parameter and then configure the analyzer 40 to run through its entire analysis regime, after which the analyzer 40 automatically may perform all operations listed in the batch processing script 44.

Block 46A represents a basic screening process, during which the analyzer 40 identifies any among the NUM INPUTS input variables that have zero variance and removes them from an estimation system model. By default during this analyzer 40 run, other RUN PARAMETERS A–F (described below under FIG. 5) may be set as follows: FORECAST STEPS=0, LEARNING BLOCKS=48, POWER DEGREE=0, and NUM STEPS=0.

Block 46B represents a linear redundancy elimination process, during which the analyzer 40 identifies any among the NUM INPUTS input variables that fail to satisfy a linear redundancy criterion and removes them from an estimation system model. By default during this analyzer 40 run, other RUN PARAMETERS A–F (described below under FIG. 5) may be set as follows: FORECAST STEPS=0, LEARNING BLOCKS=48, POWER DEGREE=0, and NUM STEPS=0. An additional analyzer configuration parameter 42 determining the redundancy criterion refers to the value of any main diagonal element of the connection weight matrix above which its corresponding input will be deemed redundant. By default during this analyzer 40 run, that value may be set to 200, and it may be set through a separate configuration process or it may be specified as a configuration parameter 42 if desired.

Once each input has been identified as redundant, the elements of the connection weight matrix involving not that input but other inputs must be adjusted to reflect the removal of the redundant input, before other inputs may be assessed for redundancy. Such elements are removed using a stepwise elimination process, which is well known to those who are knowledgeable in the field of statistical analysis.

Block 46C represents an unnecessary input removal process, during which the analyzer 40 identifies any among the NUM INPUTS input variables that are either unnecessary for estimating other inputs or non-estimable from other inputs. By default during this analyzer 40 run, other RUN PARAMETERS A–F (described below under FIG. 5) may be set as follows: FORECAST STEPS=0, LEARNING BLOCKS=48, POWER DEGREE=0, and NUM STEPS=0. Additional analyzer configuration parameters 42 determining the elimination criterion refer to the largest acceptable reduction in the multiple correlation coefficient for any other input above which a candidate for elimination must be retained in a model and the smallest acceptable value for a multiple correlation coefficient above which a candidate for elimination must remain in a model. By default, these two configuration parameters may be set to 0.01 and 0.10, respectively, and they may be set through a separate configuration process or they may be specified as a configuration parameter 42 if desired.

Block 46D represents a model tuning process, during which the analyzer 40 identifies any among several candidate models that produce the best estimation accuracy. All such candidate models are based on refinement operations 46A through 46C that have already been completed, along with other candidate criteria, such as those that are tabulated in FIG. 5, which is described below. The estimation accuracy criterion is the average value of the correlation coefficient between actual and imputed values. By default during this analyzer 40 run, other RUN PARAMETERS A–F, which may be set as follows: FORECAST STEPS=0, LEARNING BLOCKS=(candidate values shown in FIG. 5), POWER DEGREE=(candidate values shown in FIG. 5), and NUM STEPS=(candidate values shown in FIG. 5).

Block 46E represents a model assessment process, during which the analyzer 40 runs the estimation system and receives a variety of descriptive statistics, which include estimation accuracy statistics. By default during this analyzer 40 run, other RUN PARAMETERS A–F may be set as follows: FORECAST STEPS=1, LEARNING BLOCKS=48, POWER DEGREE=6, and NUM STEPS=3. A large variety of performance statistics may be generated by default and observed, including correlations between actual and imputed values, correlations between actual and forecast values, learned parameter values, alarm rates, and so on.

Block 46F represents a threshold tuning process, during which the analyzer 40 runs the estimation system for each time trial as shown in FIG. 6A. At each time trial, the analyzer 40 produces a deviance value for imputing, which has a mean of zero under expected conditions. At each time trial, the analyzer 40 may also produce a variety of other deviance values, which may include a deviance value associated with forecast monitoring for each input as well as global monitoring deviance values that may be combined over either more than one input for the current trial or more than one input over consecutive time trials, or in both ways. During a threshold tuning run 46F through the historical data 36, the analyzer 40 may collect all such deviance values into a variety of spreadsheets. At the end of the threshold tuning run 46F, the analyzer 40 may count numbers of alarms based on a variety of alarm threshold bounds, such as sounding an alarm if a deviance value exceeds plus or minus three, plus or minus four, and so on. These parameters may be set through a separate configuration process or they may be specified as a configuration parameter 42 if desired. Accordingly, the analyzer 40 may tabulate alarm counts as functions of band widths and determines output band widths that will produce acceptable alarm rates. By default during this threshold tuning 46F run, other RUN PARAMETERS A–F may be set to selected values that have been determined during prior model assessment and tuning runs 46A through 46D. Again, these parameters may be set through a separate configuration process or they may be specified as a configuration parameter 42 if desired.

Figure 7:
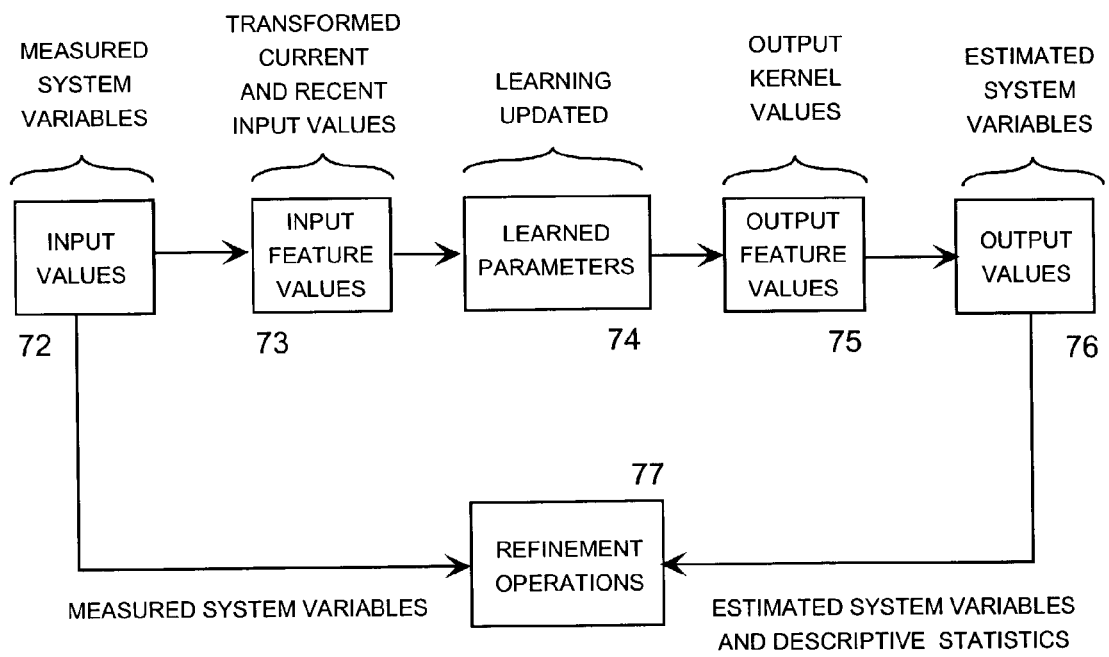
FIG. 7 is a functional block diagram illustrating a statistical model corresponding to a set of configuration parameters that may be used to configure a semi-automated analyzer.

FIG. 7 is a functional block diagram illustrating a statistical model 70 corresponding to a set of configuration parameters that may be used to configure a semi-automated analyzer 40. Blocks 72 through 75 illustrate components of a CLIP process that occur at each time trial and for which formal descriptions are readily available in the prior art. See in particular U.S. Pat. Nos. 6,216,119, 6,289,330 and 5,835,902. This process functions in conjunction with the analyzer 40 as follows. During each CURRENT TIME TRIAL shown in FIG. 6A, the engine system 10 receives NUM INPUTS input values as shown in block 72. The transducer 16 then transforms these input values along with recent input values into input feature values as shown in block 73 that are supplied to one or more kernel units 18. The kernel units 18 then update learned parameters 74 and supply output feature values 75 to the transducer 16. The transducer 16 then transforms the output feature value to output transducer values 76, which are suitable for monitoring and forecasting. In addition, during each time trial the analyzer 40 collects these output transducer values 76 along with input values 72, for model assessment, and uses them as necessary for the various refinement operations.

The coefficients of the best fitting polynomial (e.g., A, B and C shown in FIG. 6A) may be included as input feature values 73, which are used to update the learned parameters 74. Therefore, the POWER DEGREE configuration parameter, which specifies the degree of the best fitting polynomial, inherently specifies the number of coefficients included in the best fitting polynomial. The number of coefficients in the best fitting polynomial, together with the number of input values 12 specified by the NUM INPUTS configuration parameter, defines the size of an input feature vector containing the input feature values 73. In addition, the number of input values 12 specified by the NUM INPUTS configuration parameter defines the size of an output feature vector containing the output feature values 76. In turn, the sizes of the input and output feature vectors define the size of the connection weight matrix containing the learned parameters 74. Accordingly, the engine system 10 uses the POWER DEGREE and NUM INPUTS configuration parameters provided by the analyzer 40 to create input feature vectors, output feature vectors, and connection weight matrices of the appropriate size to implement the specified statistical model.

Figure 8:
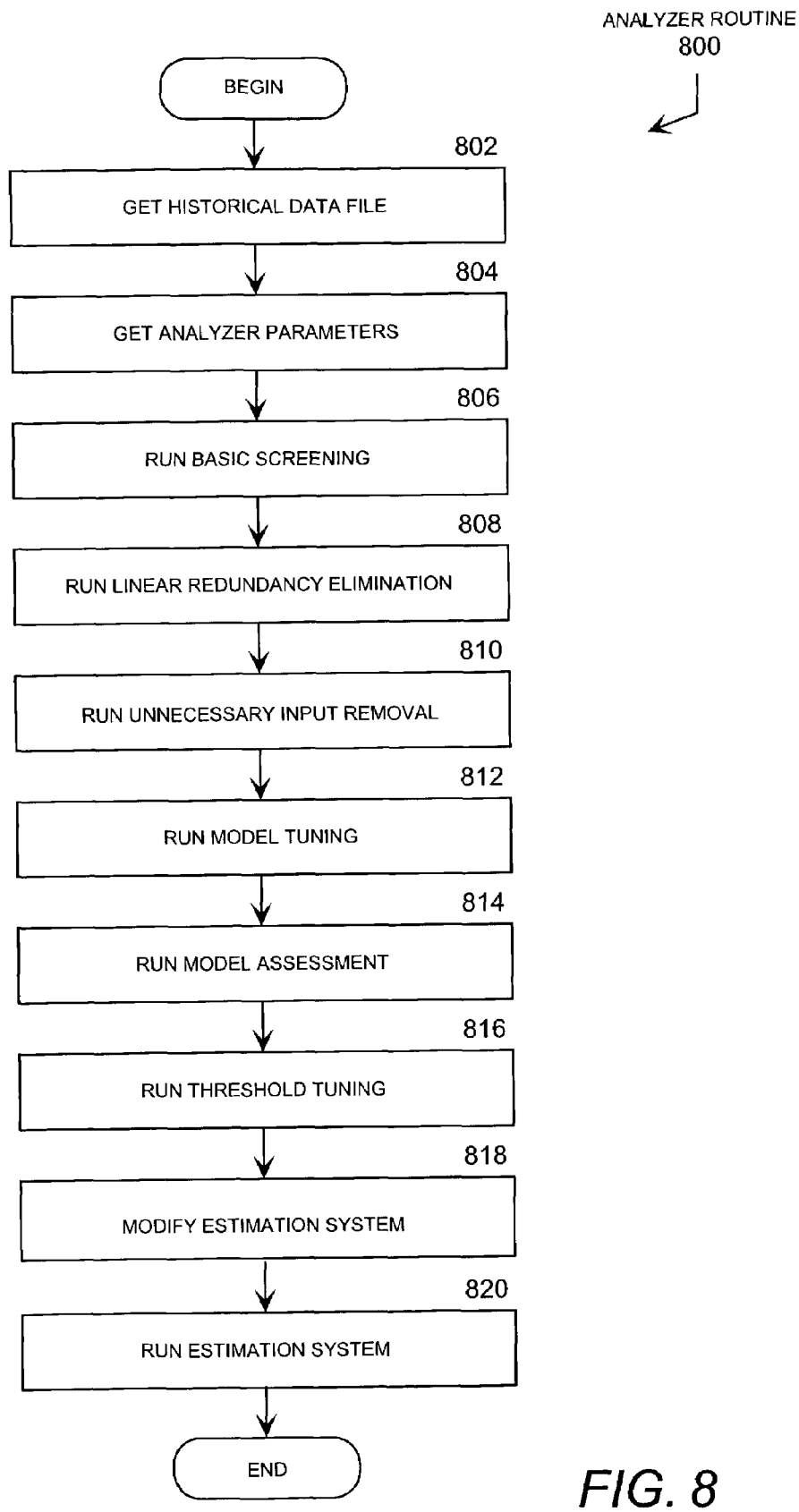
FIG. 8 is a logic flow diagram illustrating a semi-automated analyzer routine for configuring an estimation system.

FIG. 8 is a logic flow diagram illustrating a semi-automated analyzer routine 800, which may be implemented by an analyzer 40 to configure an estimation system 30. In step 802, the analyzer 40 gets the historical data file 36. Step 802 is followed by step 804, in which the analyzer 40 gets the analyzer the configuration parameters 42. Step 804 is followed by step 806, in which the analyzer 40 runs the basic screening process 46A, as described above with reference to FIG. 3. In this process, the analyzer 40 removes an input measurement from the model 70 if more than fifty percent of its values in the historical data 36 are missing or if the measurement has zero variance in the historical data 36. These parameters may be set through a separate configuration process or they may be specified as a configuration parameter 42 if desired. The analyzer 40 applies the basic screening process 46A to each of the input values 12 to remove all input values that meet the specified criteria.

Step 806 is followed by step 808, in which the analyzer 40 runs the linear redundancy elimination process 46B, as described above with reference to FIG. 3. In this process, the analyzer 40 removes an input measurement from the model 70 if any main diagonal elements of the connection weight matrix, which have been estimated from the historical data 36, exceed a criterion value. This criterion value may be set in advance in a separate configuration process or it may be set by an operator as one of the analyzer configuration parameters 42. Measurement removal occurs through a conventional stepwise elimination process that is well known in the field of statistical analysis. In effect, the analyzer 40 applies the linear redundancy elimination process 46B to each of the input values 12 to remove all input values that meet the specified criteria.

Step 808 is followed by step 810, in which the analyzer 40 runs the unnecessary input removal process 46C in a stepwise fashion, as described above with reference to FIG. 3. In this process, the analyzer 40 removes any input measurement from the model 70 that is poorly estimable in terms of its actual versus imputed correlation coefficient as estimated from the historical data 36. In particular, the analyzer 40 removes an input measurement from the model 70 if it has multiple correlation values that are less than a criterion value. This criterion value may be set in advance in a separate configuration process or it may be set by an operator as one of the analyzer configuration parameters 42. The historical data 36 are then re-analyzed with that measurement removed and the process is repeated iteratively until no measurements exceed the removal criterion.

Step 810 is followed by step 812, in which the analyzer 40 runs the model tuning process 46D, as described above with reference to FIG. 3. In this process, the analyzer 40 produces one run of the model 70 for each of several candidate model configurations, which may be the nine candidates specified in FIG. 5. For each such run, the average among all NUM INPUTS correlation coefficients between actual measurement values and their corresponding imputed values is computed. The tuned model is selected as the one among the nine competing candidate models that has the highest such average correlation coefficient. Alternative or additional assessment parameters may also be set through a separate configuration process or they may be specified as through configuration parameters 42 if desired. Step 812 is followed by step 814, in which the analyzer 40 runs the model assessment process 46E to generate a variety of model assessment statistics, as described above with reference to FIG. 3. Step 814 is followed by step 816, in which the analyzer 40 runs the threshold tuning process 46F to identify desired alarm thresholds according to process 46F, as described above with reference to FIG. 3. Step 816 is followed by step 818, in which a human analyst reviews the analyzer output data 38 and uses this information to modify the estimation system configuration parameters for real-time estimation system use. Step 818 is followed by step 820, in which a human analyst deploys the updated estimation system 30 for real-time use.

Figure 9:
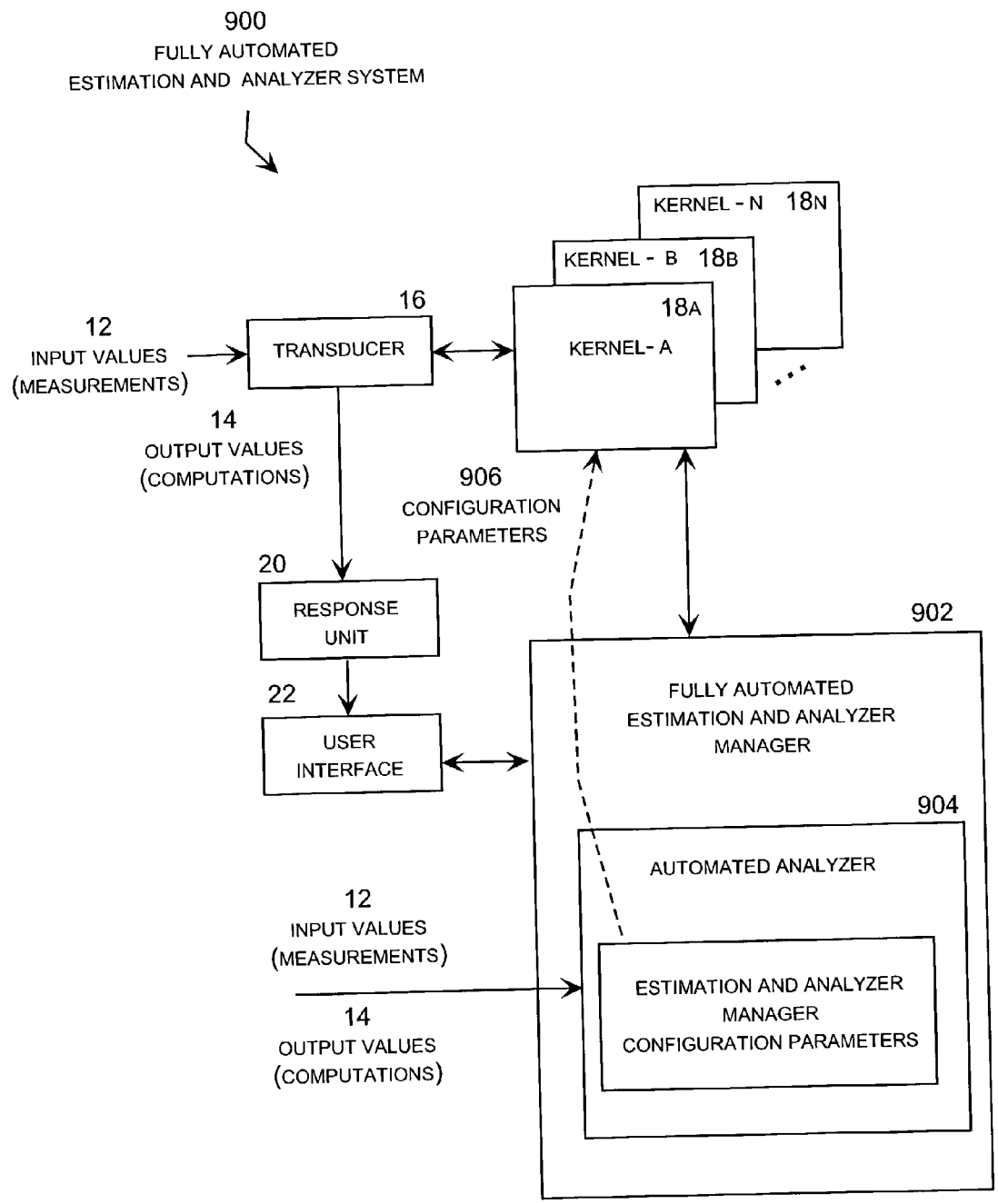
FIG. 9 is a functional block diagram illustrating a fully automated estimation and analyzer system.

FIG. 9 is a functional block diagram illustrating a fully automated estimation and analyzer system 900. The fully automated estimation and analyzer (E/A) system 904 operates in conjunction with various engine system 10 components, including input values 12, the transducer 16, kernel units 18, output values 14, the response unit 20, and the user interface 22, which operate continually and automatically. The system 904 also operates in conjunction with the (E/A) manager 902, which coordinates continual, automatic operation of the engine system 10 components with operation of the fully automated analyzer 904. The analyzer 904, in turn, is a fully automated alternative to its previously described, semi-automated counterpart 40. In particular, the system 904 operates as an EXE in its own right, and it operates as a fully automatic estimation system that incorporates the functionality of its counterpart 40 in real time. However, the system 904 operates continually and automatically with real-time data, rather than in batch mode and manually with historical data. The analyzer 904 enhances or replaces each of the semi-automated analyzer routine 800 steps, as explained below. The get historical data file process 802 for receiving historical data 36 is not required by the system 904, which instead processes time trials continually and automatically like the engine system 10.

The system 904 receives E/A analyzer configuration parameters 906 instead of semi-automated analyzer configuration parameters 42. E/A parameters include engine system configuration parameters 26 and the previously described analyzer configuration parameters 42, along with a scheduling parameter, called the E/A epoch, that specifies how often, in terms of time trials, that the E/A analyzer process occurs. This parameters may be set through a separate configuration process or it may be specified as a configuration parameter 42 if desired. In an APM system, for example, an appropriate E/A epoch may be once a month, once a week, or once a day, as determined from experience.

The system 904 counterpart to the basic screening process 806 removes a measurement from a model according to process 46A if more than fifty percent of its values during the most recent E/A epoch have been missing or if the measurement has had zero variance during the period. The E/A analyzer also reassesses all measurements that have been previously removed according to this criterion and reintroduces them into the model if the criterion is no longer satisfied in the most recent E/A epoch.

The system 904 counterpart to the linear redundancy elimination process 808 removes one or more measurements from a model according to process 46B if any main diagonal elements of the connection weight matrix at the end of the most recent E/A epoch exceed a positive criterion value, which is configurable by the analyzer configuration parameters 42 through a conventional stepwise elimination process as previously described with reference to FIGS. 4 and 8. The system 904 also reassesses all measurements that have been previously removed according to this criterion and re-introduces them into the model if the criterion is no longer satisfied in the most recent E/A epoch.

The system 904 counterpart to the unnecessary input removal process 810 operates identically, except the 904 counterpart uses data available at the end of the most recent E/A epoch for computing multiple correlation coefficients instead of historical data 36. The E/A analyzer also reassesses all measurements that have been previously removed according to this criterion and re-introduces them into the model if the criterion is no longer satisfied in the most recent E/A epoch.

The system 904 counterpart to the model tuning process 812 operates one or more kernel units 18 for each of several candidate model configurations, which may be the nine candidates specified according to process 46D. At the end of each E/A epoch, the E/A model identifies the best model among competing models exactly as tuning process 812, but with one exception. Instead of comparing candidate results of consecutive runs based on historical data 36, the system 904 counterpart compares candidate results obtained from the most recent E/A epoch based on candidate models running in parallel.

The system 904 counterpart to the model assessment process 814 generates a variety of model assessment statistics in a similar manner to that described previously for process 46E, but with one exception. Instead of generating assessment statistics after a run through the historical data 36, the system 904 counterpart produces the statistics at the end of the most recent E/A epoch.

The system 904 counterpart to the threshold tuning process 816 identifies optimal alarm thresholds in a similar manner to that described previously for process 44F, but with one exception. Instead of identifying optimal thresholds based on a run through the historical data 36, the system 904 counterpart produces the thresholds based on the most recent E/A epoch.

The system 904 counterpart to the modify estimation system configuration parameters process 818 entails setting engine system configuration parameters automatically by the E/A manager for engine system use during the next epoch, rather than manually by a human analyst, for real-time estimation system use.

The system 904 counterpart to the run estimation system process 822 entails the automatic configuration and deployment of the E/A system for real-time use during the next E/A epoch, rather than manual configuration and deployment by a human analyst of the estimation system for real-time use.

The E/A system 800 complements the semi-automated analyzer 40, in that each offers distinct advantages over the other. When used with a human analyst, the semi-automated analyzer 40 can add sufficient insight into the analysis process that its output, along with the analyst's expertise, can produce more efficient models than could the fully automated system 800. Moreover, the semi-automated analyzer 40 can be used with historical data as part of proof-of-concept analyses, which in turn can be used to decide whether or not the fully automated system 800 is worth deploying and whether or not certain inputs are worth integrating into any given estimation system. On the other hand, the fully automated system 800 offers operational cost reductions associated with complete automation, along with the potential for increasing operational efficiency by being able to complete refinement operations that would otherwise be impractical or impossible using the semi-automated analyzer 40. For these reasons, the semi-automated analyzer 40 and the fully automated system 800 may be advantageously used separately or in combination for any particular estimation system.

Figure 10:
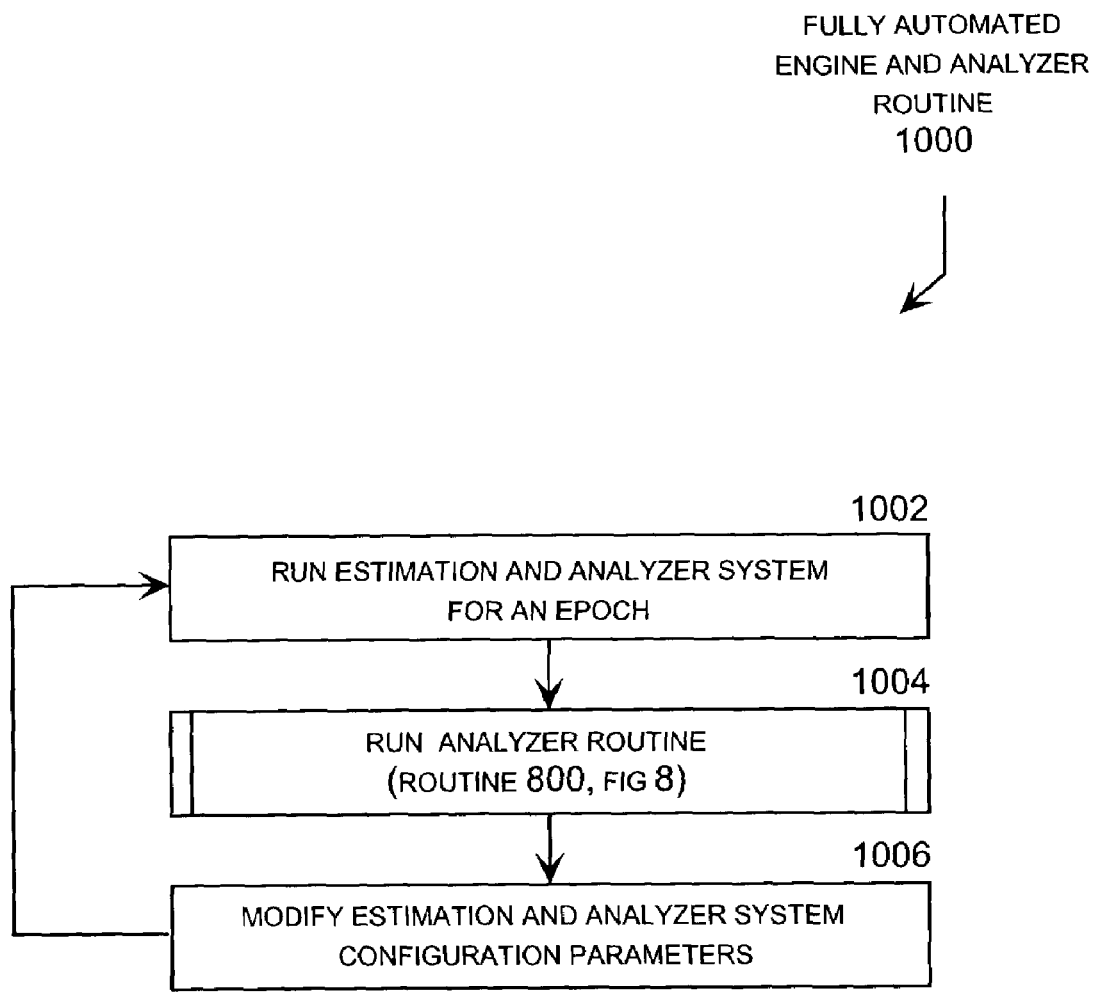
FIG. 10 is a logic flow diagram illustrating a routine for a fully automated analyzer and estimation system.

FIG. 10 is a logic flow diagram illustrating a routine 1000 for a fully automated analyzer and estimation system 902. In step 1002, the system 902 runs components of the engine system 10 that are shown in FIG. 9 for a number of time trials between each E/O epoch that is typically pre-specified as an E/A configuration parameter. Step 1002 is followed by step 1004, in which system 902 runs the analyzer routine 800 (FIG. 8) at the end of each E/O epoch. Step 1004 is followed by step 1006, in which system 902 updates the engine system configuration parameters 26 at the end of each E/O epoch and prior the beginning of the next E/O epoch. The system 902 then loops through steps 1002, 1004, and 1006 to continually run and update the estimation systems.

Although specifically illustrated for use in conjunction with components of the engine system 10, it may be readily recognized that the fully automated analyzer 902 may also be used in connection with other types of estimation systems including, but not limited to conventional statistics and artificial neural network systems. Furthermore, the configuration systems described and claimed in this patent for APM may be applied to a variety of fields, including but not limited to electricity demand forecasting, commodities price forecasting, aircraft component failure monitoring, image processing, and so forth.

Those skilled in the art of computer system architecture will appreciate that in its most basic embodiment, the analyzer may be implemented in a monolithic way using a low-level computer programming language, such as "C" (manufactured by Microsoft Corporation of Redmond, Wash.) or any other suitable programming language, and run on a single-processor computer with input and output data is stored in files. Alternatively, the system may be implemented using a high-level distributed systems programming paradigm (e.g., client-server, web services) and run on a middleware platform system such as, but not limited to, Sun ONC/RCP, Microsoft DCOM, Microsoft ASP NET, Java RMI, CORBA, OSF DCE, XML-based Web services (SOAP/WSDL/UDDI), Enterprise Java Bean, LDAP and so on. In such instances, the analyzer's component may be distributed and run on a variety of computer platform and may communicate with each others in a plurality of ways. For examples, the individual system objects/components themselves may reside on several computers and communicate using diverse communication protocols such as TCP/UDP/IP, XDR, JRMP, HTTP, IIOP, etc., and data may be exchanged in a variety of representations such as byte streams, XDR, Java Marshalled Object, SOAP, CDR, any other presently available or developed in the future.

It should also be understood that the analyzer-engine system may be invoked locally or remotely, and may obtain its data locally or remotely, from one source or from several sources, and may report its output results locally or remotely, for example to a third party human or computer application. In addition, a remote invocation of the analyzer engine system may be programmatic or via a human user interface, for example via a web browser interface or a graphical user interface. The output reporting method may also be programmatic or human readable, for example via text, web browser based or graphical reporting interface.

It should also be appreciated that a single analyzer may be used to provide analytical and reporting services for a number of engine systems, for example on a fee-for-service basis. That is, a number of engine systems deployed in distributed systems may periodically contact a single remotely-located analyzer to obtain model and reporting refinement services. In particular, scheduled maintenance to periodically perform these operations may be scheduled to occur automatically and during convenient times, such as at night or on weekends. In addition, thin client applications, such as a browser or a browser enhanced by a JAVA download, may be used to access and control a remote analyzer system and receive its reported results over a network, such as the Internet, for real-time engine system analysis. Access to this type of analyzer may be provided as a fee-for-service basis during regular business working hours. In this manner, a single analyzer may support a large number of operating engine systems, providing both scheduled maintenance and real-time engine support. Many other computer architectures and business models for deploying the analyzer system will become apparent to those skilled in the art, and fall within the spirit and scope of the present invention.

In view of the foregoing, it will be appreciated that the present invention provides an effective, useful and understandable system for automatically configuring and monitoring computerized estimation systems. The invention also provides an effective system for implementing corrective action to avoid and respond to detected or predicted disruptions in monitored performance. It should be understood that the foregoing relates only to the exemplary embodiments of the present invention, and that numerous changes may be made therein without departing from the spirit and scope of the invention as defined by the following claims.

The invention claimed is:

1. A method for operating an analyzer for an estimation system operable for receiving input values for successive time trials, computing output values based on the input values and learned parameters, and updating the learned parameters to reflect relationships observed among the input and output values, comprising the steps of:
   (a) receiving historical data comprising samples of the input and output values for a plurality of time trials;
   (b) receiving a set of model configuration parameters including specifications for a statistical model that may be implemented by the estimation system;
   (c) activating the estimation system to run the historical data on the statistical model to compute the output values and the learned parameters for the statistical model;
   (d) analyzing the learned parameters to identify input values that are ineffective for estimating the output values;
   (e) reducing the size of the model by eliminating the ineffective input values; and
   (f) periodically repeating steps (a) though (e) to reinstate into the model previously eliminated input values that have become effective for predicting the output values.

2. The method of claim 1, wherein the step of analyzing the learned parameters to identify input values that are ineffective for estimating the output values comprises basic screening, linear redundancy elimination, and unnecessary input removal.

3. An apparatus configured to perform the method of claim 1 or a computer storage medium storing instructions for causing the apparatus to perform the method of claim 1.

4. A method for operating an analyzer for an estimation system operable for receiving input values for successive time trials, computing output values based on the input values and learned parameters, and updating the learned parameters to reflect relationships observed among the input and output values, comprising the steps of:
   receiving historical data comprising samples of the input and output values for a plurality of time trials;
   receiving a plurality of sets of candidate model configuration parameters, each set including specifications for a an intrinsically different statistical model that may be implemented by the estimation system;
   activating the estimation system to run the historical data on each statistical model to compute the output values and learned parameters for each statistical model;
   performing a qualitative model assessment for each statistical model;
   identifying a best-performing statistical model based on the plurality of qualitative model assessments; and
   implementing the best-performing statistical model with the estimation system to compute output values for future time trials.

5. An apparatus configured to perform the method of claim 4 or a computer storage medium storing instructions for causing the apparatus to perform the method of claim 4.

6. The method of claim 4, wherein:
   the configuration parameters identify a number of historical input values and a power degree for computing a best fit polynomial of the identified degree to the identified historical input values; and
   coefficients for the best fit polynomial are used to update the learned parameters.

7. The method of claim 5, wherein the configuration parameters identify a learning parameter for use in updating the learned parameters.

8. The method of claim 7, wherein the plurality of candidate model configuration parameters reflect variations of the parameters comprising the number of historical input value, the polynomial degree, and the learning parameter.

9. The method of claim 1, wherein the configuration parameters identify a number of forecast steps for computing output values.

10. A method for operating an analyzer for an estimation system operable for receiving input values for successive time trials, computing output values based on the input values and learned parameters, and updating the learned parameters to reflect relationships observed among the input and output values, comprising the steps of:
   receiving historical data comprising samples of the input and output values for a plurality of time trials;
   receiving a plurality of sets of candidate model configuration parameters, each set including specifications for an intrinsically different statistical model that may be implemented by the estimation system;
   activating the estimation system to run the historical data on each statistical model to compute the output values and learned parameters for each statistical model;
   analyzing the learned parameters to identify input values that are ineffective for estimating the output values;
   reducing the size of the model by eliminating the ineffective input values;
   performing a qualitative model assessment for each statistical model;

selecting a best-performing statistical model for the estimation system based on the plurality of qualitative model assessments; and implementing the best-performing statistical model with the estimation system to compute output values for future time trials.

11. The method of claim 10, wherein:

the configuration parameters identify a number of historical input values and a power degree for computing a best fit polynomial of the identified degree to the identified historical input values; and coefficients for the best fit polynomial are used to update the learned parameters.

12. The method of claim 11, wherein the configuration parameters identify a learning parameter for use in updating the learned parameters.

13. The method of claim 12, wherein the plurality of candidate model configuration parameters reflect variations of the parameters comprising the number of historical input value, the power degree, and the learning parameter.

14. The method of claim 13, wherein:

the configuration parameters identify a number of forecast steps for computing output values.

15. A method for operating an analyzer for an estimation system operable for receiving input values for successive time trials, computing output values based on the input values and learned parameters, and updating the learned parameters to reflect relationships observed among the input and output values, comprising the steps of:

receiving historical data comprising samples of the input and output values for a plurality of time trials;

receiving a set of candidate model configuration parameters including specifications for a statistical model that may be implemented by the estimation system;

activating the estimation system to run the historical data on the statistical model to compute the output values and learned parameters for the statistical model;

computing alert thresholds for output values based on observed deviance values between the computed output values and the historical samples of output values to obtain a desired alert sensitivity;

computing a global deviance value for the output values; and computing a global deviance threshold for the global deviance value based on observed deviance between the computed output values and the historical samples of output values to obtain a desired alarm sensitivity.

16. An apparatus configured to perform the method of claim 15.

17. A method for operating an analyzer for an estimation system operable for receiving input values for successive time trials, computing output values based on the input values and learned parameters, and updating the learned parameters to reflect relationships observed among the input and output values, comprising the steps of:

continually running several intrinsically different competing models on the estimation system;

occasionally qualitatively assessing the results from the competing models;

based on the qualitatively assessments; identifying a best recently performing model; and generating the output values based on the best recently performing model.

18. The method of claim 17, further operable for:

continually monitoring and adjusting an alarm threshold for the best recently performing model.

19. The method of claim 18, wherein the step of continually monitoring and adjusting an alarm threshold comprises the steps of:

computing a global deviance value for the output values; and computing a global deviance threshold for the global deviance value based on observed deviance between the computed output values and the historical samples of output values to obtain a desired alarm sensitivity.

20. The method of claim 17, wherein:

the competing models comprise configuration parameters identifying a number of historical input values and a power degree for computing a best fit polynomial of the identified degree to the identified historical input values; and coefficients for the best fit polynomial are used to update the learned parameters.

21. An apparatus configured to perform the method of claim 10.

22. An apparatus configured to perform the method of claim 17.

23. A computer storage medium storing instructions for causing said apparatus to perform the method of claim 15.

24. A computer storage medium storing instructions for causing said apparatus to perform the method of claim 10.

25. A computer storage medium storing instructions for causing said apparatus to perform the method of claim 17.

* * * * *